(12) United States Patent
Yang et al.

(10) Patent No.: US 11,024,910 B2
(45) Date of Patent: Jun. 1, 2021

(54) SULFATE/SULFIDE BASED RECHARGEABLE BATTERY AND USES THEREOF

(71) Applicant: Universidade De Aveiro, Aveiro (PT)

(72) Inventors: Tao Yang, Aveiro (PT); Sergey M. Mikhalev, Aveiro (PT); Aliaksandr Shaula, Aveiro (PT); Duncan P. Fagg, Aveiro (PT)

(73) Assignee: Universidade De Aveiro, Aveiro (PT)

( * ) Notice: Subject to any disclaimer, the term of this patent is extended or adjusted under 35 U.S.C. 154(b) by 97 days.

(21) Appl. No.: 16/488,035

(22) PCT Filed: Feb. 22, 2018

(86) PCT No.: PCT/IB2018/051118
§ 371 (c)(1),
(2) Date: Aug. 22, 2019

(87) PCT Pub. No.: WO2018/154488
PCT Pub. Date: Aug. 30, 2018

(65) Prior Publication Data
US 2019/0379009 A1    Dec. 12, 2019

(30) Foreign Application Priority Data

Feb. 22, 2017  (PT) ........................... 109928
Dec. 11, 2017  (PT) ........................... 110449

(51) Int. Cl.
| | | |
|---|---|---|
| *H01M 50/138* | (2021.01) | |
| *H01M 8/04082* | (2016.01) | |
| *H01M 50/116* | (2021.01) | |
| *H01M 50/183* | (2021.01) | |

(52) U.S. Cl.
CPC ... *H01M 50/1385* (2021.01); *H01M 8/04201* (2013.01); *H01M 50/116* (2021.01); *H01M 50/183* (2021.01); *H01M 2300/0074* (2013.01)

(58) Field of Classification Search
CPC .......... H01M 50/1385; H01M 50/116; H01M 50/183; H01M 8/04201; H01M 2300/0074
See application file for complete search history.

(56) References Cited

U.S. PATENT DOCUMENTS

| | | |
|---|---|---|
| 6,270,651 B1 | 8/2001 | Essalik |
| 2009/0148742 A1* | 6/2009 | Day .................... H01M 4/8885 |
| | | 429/483 |

(Continued)

FOREIGN PATENT DOCUMENTS

| | | |
|---|---|---|
| CN | 101478047 | 7/2009 |
| CN | 105552412 | 5/2016 |

(Continued)

OTHER PUBLICATIONS

Xu Z et al: "Effect of oxygen storage materials on the performance of proton-exchange membrane fuel cells", Journal of Power Sou, Elsevier SA, CH, vol. 115, No. 1, Mar. 27, 2003 (Mar. 27, 2003), pp. 40-43.

(Continued)

*Primary Examiner* — Stewart A Fraser
(74) *Attorney, Agent, or Firm* — Leason Ellis LLP (57) ABSTRACT

The present disclosure relates to the development and improvement of a High-Temperature Sulfate/Sulfide device, in particular a High-Temperature battery using a Sulfate/Sulfide redox couple (HTSSB) for electrical energy storage at elevated temperatures and the like, and electrical energy storage device comprising the same.

20 Claims, 5 Drawing Sheets

(56) References Cited

U.S. PATENT DOCUMENTS

| | | |
|---|---|---|
| 2010/0130350 A1 | 5/2010 | Machida et al. |
| 2012/0214665 A1 | 8/2012 | Miura |
| 2016/0111742 A1 | 4/2016 | Han et al. |

FOREIGN PATENT DOCUMENTS

| | | |
|---|---|---|
| EP | 0259175 | 3/1988 |
| JP | 2013127908 | 6/2013 |
| WO | 0247802 | 6/2002 |
| WO | 2013090680 | 6/2013 |
| WO | 2016141765 | 9/2016 |

OTHER PUBLICATIONS

Masato Machida et al: "Novel oxygen storage mechanism based on redox of sulfur in lanthanum oxysulfate/oxysulfide",Chemical Communications,No. 6, Feb. 10, 2004 (Feb. 10, 2004), pp. 662-663.
Masato Machida et al: "Large-Capacity Oxygen Storage by Lanthanide Oxysulfate/Oxysulfide Systems", Chemistry of Materials, vol . 17, No. 6, Feb. 26, 2005 (Feb. 26, 2005), pp. 1487-1492.
International Search Report and Written Opinion dated May 11, 2018 corresponding to International Patent Application No. PCT/IB2018/051118; 15 pages.
Yang, T. et al: "Silver-praseodymium oxysulfate cermet: A new composite cathode for intermediate temperature solid oxide fuel cells"; Journal of Power Sources, 306 (2016); 611-616.

\* cited by examiner

SULFATE/SULFIDE BASED RECHARGEABLE BATTERY AND USES THEREOF

CROSS-REFERENCE TO RELATED PATENT APPLICATIONS

This application is a U.S. National Stage Application under 35 U.S.C. § 371 of International Patent Application No. PCT/IB2018/051118, filed Feb. 22, 2018, which claims the benefit of priority to Portuguese Patent Application number PT 109928 filed Feb. 22, 2017 and Portuguese Patent Application number PT 110449 filed Dec. 11, 2017, all of which are incorporated by reference as if set forth in their respective entireties herein.

TECHNICAL FIELD

The present disclosure relates to the development and improvement of a High-Temperature Sulfate/Sulfide device, preferably containing an alkali metal, alkaline earth metal or rare earth element, more preferably sodium (Na), calcium (Ca) or Lanthanum (La), in particular a High-Temperature battery using a Sulfate/Sulfide redox couple (HTSSB) for electrical energy storage at elevated temperatures and the like, and electrical energy storage device comprising the same.

BACKGROUND

Electricity storage and conversion devices are sophisticated, expensive, and important. Batteries such as Na—S, Li-ion, Li-air, Zn-air, Ni—Cd, Pd-Acid, Ni—H and super-capacitors, are main electrical energy storage/release devices that save/supply the electricity in electrochemical processes. Fuel cells, such as SOFCs, PEMFCs and MCFCs are electrochemical-to-electrical energy conversion/release devices which consume fuels and oxidants and convert them into electricity. Batteries and fuel cells are both realized by electron and ion charge/discharge processes.

Electrochemical-to-electrical energy conversion and storage devices, despite of whatever type of the fuel cell, battery or super-capacitor, are not satisfactory enough for the time being. Especially, the technology for the storage and release of electrical energy at high charge/discharge rates is an important benchmark which already hinders to some extent the progress of today's society. Hybrid electric vehicles, realization of the smart grid, and back-up power for wind and solar energy sources (unstable due to their dependence on wind and sun, respectively) depend on the breakthrough of the higher specific energy density devices. In electrochemical systems, people tend to consider that ultrafast charging and discharging rates can only be achieved with super-capacitors, which trade these rates for specific energy density due to the surface adsorption reactions of charged species on an electrode material.

Also, volatilization and flammability are serious safety issues for the conventional lithium batteries since liquid electrolyte is used and lithium dendrites are formed during the charge/discharge process.

These facts are disclosed in order to illustrate the technical problem addressed by the present disclosure.

General Description

An aspect of the present subject-matter is to provide a safe battery, embodiments of which are herewith designated namely as HTSSB, which offers unique combination of a conventional solid oxide electrochemical cell with that of oxygen storage/release reactions to provide an ultra-high specific energy density system with increased lifetime and charge/discharge rates for many commercial applications. This device accumulates electrical energy in oxygen form inside a sulfate compound, such as $A_2SO_4$, $MSO_4$ or $Ln_2O_2SO_4$ and presents stable charge/discharge rates, where A is any alkali metal, preferably sodium (Na), M is any alkaline earth metal, more preferably calcium (Ca) and Ln is any rare earth element, preferably a lanthanide, more preferably lanthanum (La).

In an embodiment, the operation of the HTSSB's of the present disclosure is based on a simple oxygen storage/release reaction between Lanthanum oxysulfate/oxysulfide ($La_2O_2SO_4/La_2O_2S$) and atmospheric oxygen at 750-950° C. The oxygen partial pressure threshold of oxygen releasing from lanthanum oxysulfate in the sealed cell has been identified as a key issue in order to determine the end-of-charge voltage and ensure long term stability. Lanthanum oxysulfate/oxysulfide is selected as electrical energy storage material because its capacity approaches about 528 mA·h·$g^{-1}$, giving a theoretical specific energy density of around 1.5 MJ·$kg^{-1}$; significantly higher than that of commercial Li-ion batteries. More than about 1000 hours of charge/discharge cycles were performed at 700-900° C., showing high stability, reversibility and cyclability.

In further embodiments the rare earth component of the $Ln_2O_2SO_4$ storage material is either one or a combination of more than one of the following elements, cerium (Ce), dysprosium (Dy), erbium (Er), europium (Eu), gadolinium (Gd), holmium (Ho), lanthanum (La), lutetium (Lu), neodymium (Nd), promethium (Pm), samarium (Sm), scandium (Sc), terbium (Tb), thulium (Tm), ytterbium (Yb) and yttrium (Y).

In a further embodiment, the operation of the HTSSB's of the present disclosure is based on a simple oxygen storage/release reaction between calcium sulfate/sulfide ($CaSO_4$/$CaS$) and atmospheric oxygen at 750-1000° C. Calcium sulfate/sulfide is selected as electrical energy storage material because its specific energy density approaches about 5 MJ·$kg^{-1}$; significantly higher than that of commercial Li-ion batteries, and also significantly higher than the previous lanthanum oxysulfate example. Moreover, the redox material $CaSO_4$ is formed from elements that are highly abundant on earth, Ca, S, thereby lowering environmental impact. Charge/discharge cycles were performed at 800-1000° C., showing high stability, reversibility and cyclability.

In further embodiments the alkaline earth metal component of the $MSO_4$ storage material is either one or a combination of more than one of the following elements, magnesium (Mg), calcium (Ca), strontium (Sr) or barium (Ba).

In a further embodiment, the operation of the HTSSB's of the present disclosure is based on a simple oxygen storage/release reaction between sodium sulfate/sulfide ($Na_2SO_4$/$Na_2S$) and atmospheric oxygen at 600° C. Sodium sulfate/sulfide is selected as electrical energy storage material because its capacity approaches about 5 MJ·$kg^{-1}$; significantly higher than that of commercial Li-ion batteries, and also significantly higher than the previous lanthanum oxysulfate example. Moreover, the redox material $Na_2SO_4$ is formed from elements that are highly abundant on earth, Na, S, thereby offering low environmental impact. Charge/discharge cycles were performed at 600° C., showing high stability, reversibility and cyclability.

In further embodiments the rare earth component of the $A_2SO_4$ storage material is either one or a combination of more than one of the following elements, lithium (Li), sodium (Na), potassium (K).

The oxygen ions diffuse through a solid oxide electrolyte between electrodes, where the redox sulfate/sulphide redox system, sealed inside the cell, works in a solid or liquid state. This allows the oxygen storage/release reactions to take place and overcomes the aforementioned problems derived from the use of conventional batteries.

The electrochemical reactions that take place in this new battery system are completely different from those in metal-air batteries, SOFCs or their hybrids. Contrary to other electrochemical devices, the HTSSB is only electrically rechargeable when the oxygen partial pressure inside the cell reaches critical values. Another advantage is that HTSSB is able to use only oxygen from air, or any other oxygen containing atmosphere and therefore it does not need a fuel distribution system.

The present disclosure includes:
(1) An oxygen storage/release material, comprising a compound consisting of sulfate/sulfide redox couples such as $A_2SO_4/A_2S$ and/or $MSO_4/MS$ and/or $Ln_2O_2SO_4/Ln_2O_2S$, or their mixtures, which have an oxygen integration and disintegration capacity under a certain oxygen partial pressure
(2) An oxide-ion conducting membrane, comprising a compound consisting of oxide-ion conducing ceramic, with electronically conducing electrodes on its both sides with electrical contacts for electrical conduction thereon.
(3) An gas-tight shell housing the membrane and electrodes and containing the oxygen storage/release material.
[4] A rechargeable battery, comprising the oxygen storage/release material, the membrane and electrodes and the housing disclosure in the present subject-matter.

An aspect of the present subject-matter is to provide
a rare earth, $Ln_2O_2SO_4/Ln_2O_2S$, oxygen storage material contained in said contained volume wherein Ln is a rare earth element or combination of rare earth elements;
an alkaline earth metal, $MSO_4/MS$, oxygen storage material contained in said contained volume wherein M is an alkaline earth element or combination of alkaline earth elements;
an alkaline metal, $A_2SO_4/A_2S$, oxygen storage material contained in said contained volume wherein A is an alkali metal element or combination of alkali metal elements;
an oxygen storage material contained in said contained volume formed by a combination or combinations of the $A_2SO_4/A_2S$, $MSO_4/MS$, $Ln_2O_2SO_4/Ln_2O_2S$ systems;
a first electrode in contact with an oxygen-ion conducting electrolyte contained in the said gas-tight container and in contact with said contained volume;
a second electrode in contact with the opposite side of the said oxygen-ion conducting electrolyte contained in the gas-tight container and in contact with an oxygen containing atmosphere;
wherein the rare earth solid state oxygen storage material is in powder, liquid or porous form;
wherein the electrolyte is an oxygen-ion conducting membrane;
wherein the electrodes are selected from an electronically conducting material;
comprising an gas tight container for containing with the oxygen storage material inside said contained volume;
wherein the oxygen exchanged with the atmosphere outside the gas tight container may or may not be involved in further chemical reactions or be utilised as a method to purify oxygen.

An aspect of the present subject-matter is a rechargeable battery comprising a solid-state device for oxygen storage and release comprising:
a gas-tight shell that contains or is made in its entirety of an oxygen-ion conducting electrolyte and defines a contained volume;
an oxygen storage material consisting of a sulfate/sulfide redox couple, contained in said contained volume;
a first electrode in contact with said electrolyte and in contact with said contained volume;
a second electrode in contact with the other side of the said electrolyte and in contact with an oxygen containing atmosphere;
an electrical contact made with each electrode;
wherein the electrodes are selected from an electronically conducting material;
wherein the oxygen exchanged with the atmosphere outside the gas tight container, preferably air, may or may not be involved in further chemical reactions or be utilised as a source of pure oxygen.
wherein the oxygen storage material is selected from a list consisting of the following elements: gadolinium, lanthanum, cerium, neodymium, samarium, dysprosium, erbium, europium, holmium, terbium, ytterbium, yttrium, scandium, lutetium, magnesium, calcium, strontium, barium, lithium, sodium, potassium or combinations thereof.

In an embodiment for better results, the oxygen storage material is in powder, porous, molten form, or mixtures thereof.

In an embodiment for better results, the contained volume further comprises a shuttle gas for increase the kinetics of oxygen transfer to the storage material.

In an embodiment for better results, the shuttle gas comprises a mixture of: steam/hydrogen (H2O/H2) gas mixture, a carbon dioxide/carbon monoxide (CO2/CO2) gas mixture, or mixture thereof. Preferably, the shuttle gas further comprises an inert gas for diluting.

In an embodiment for better results, the sulfate/sulfide redox couple is rare earth oxysulfate Ln2O2SO4/Ln2O2S based oxygen storage material, wherein Ln comprises: gadolinium, lanthanum, cerium, neodymium, samarium, dysprosium, erbium, europium, holmium, terbium, ytterbium, yttrium, scandium, lutetium, promethium, thulium, or combinations thereof, wherein Ln is rare earth element or combination of rare earth elements.

In an embodiment for better results, Ln is: gadolinium, lanthanum, cerium, neodymium, samarium, dysprosium, erbium, europium, holmium, terbium, ytterbium, yttrium, scandium, lutetium, promethium, thulium, or combinations thereof, wherein Ln is a rare earth element or combination of rare earth elements.

In an embodiment for better results, the sulfate/sulfide redox couple is an alkaline earth metal sulfate MSO4/MS based oxygen storage material, wherein M comprises: magnesium, calcium, strontium, barium, or combinations thereof, wherein M is an alkaline earth metal element or combination of alkaline earth metal elements.

In an embodiment for better results, M is magnesium, calcium, strontium, barium, or combinations thereof, wherein M is an alkaline earth metal element or combination of alkaline earth metal elements.

In an embodiment for better results, the sulfate/sulfide redox couple is an alkali metal sulfate A2SO4/A2S based oxygen storage material, wherein A comprises: lithium, sodium, potassium or combinations thereof, wherein A is an alkali metal element or combination of alkali metal elements.

In an embodiment for better results, A is lithium, sodium, potassium, or mixtures thereof.

In an embodiment for better results, $(Na,A)_2SO_4/(Na,A)_2S$ is a sulfate based oxygen storage material, wherein A comprises an alkali metal element or combination of alkali earth metal elements.

In an embodiment for better results, A is an alkali metal element or combination of alkali metal elements, preferably wherein A is lithium, potassium or combinations thereof.

In an embodiment for better results, $(Li,A)_2SO_4/(Li,A)_2S$ is a sulfate based oxygen storage material, wherein A comprises an alkali metal element or combination of alkali earth metal elements.

In an embodiment for better results, A is an alkali metal element or combination of alkali metal elements, preferably wherein A is sodium, potassium or combinations thereof.

In an embodiment for better results, $(Ca,M)SO_4/(Ca,M)S$ is a sulfate based oxygen storage material, wherein M comprises an alkaline earth metal element or combination of alkaline earth metal elements.

In an embodiment for better results, M is an alkaline earth metal element or combination of alkaline earth elements, preferably wherein M is magnesium or strontium or barium, or combinations thereof.

In an embodiment for better results, $(Mg,M)SO_4/(Mg,M)S$ is a sulfate based oxygen storage material, wherein M comprises an alkaline earth metal element or combination of alkaline earth metal elements.

In an embodiment for better results, M is an alkaline earth metal element or combination of alkaline earth metal elements preferably, wherein M is calcium or strontium or barium, or combinations thereof.

In an embodiment for better results, $(Ln)_2O_2SO_4/(Ln)_2O_2S$ is a sulfate based oxygen storage material, wherein Ln comprises a rare earth element or combination of rare earth metal elements.

In an embodiment for better results, Ln is: gadolinium, lanthanum, cerium, neodymium, samarium, dysprosium, erbium, europium, holmium, terbium, ytterbium, yttrium, scandium, lutetium, promethium, thulium, or combinations thereof.

In an embodiment for better results, the oxygen storage materials is a mixture of $Ln_2O_2SO_4/Ln_2O_2S$ and/or the $MSO_4/MS$ and/or the $A_2SO_4/A_2S$, in particular in any ratio, either as independent phases or as a combined phase, wherein Ln is rare earth element or combination of rare earth elements, wherein M is an alkaline earth metal element or combination of alkaline earth metal elements, and;

wherein A is an alkali metal element or combination of alkali metal elements.

In an embodiment for better results, wherein Ln is selected from a list consisting of: gadolinium, lanthanum, cerium, neodymium, samarium, dysprosium, erbium, europium, holmium, terbium, ytterbium, yttrium, scandium, lutetium, promethium, thulium, or combinations thereof, wherein M is selected from a list consisting of: magnesium, calcium, strontium, barium, or combinations thereof, wherein A is selected from a list consisting of lithium, sodium, potassium or combinations thereof.

In an embodiment for better results, it may be combined a mixture of $Ln_2O_2SO_4/Ln_2O_2S$ and the $MSO_4/MS$ oxygen storage materials wherein Ln is rare earth element or combination of rare earth elements, and, wherein M is an alkaline earth metal element or combination of alkaline earth metal elements.

In an embodiment for better results, wherein Ln comprises: gadolinium, lanthanum, cerium, neodymium, samarium, dysprosium, erbium, europium, holmium, terbium, ytterbium, yttrium, scandium, lutetium, promethium, thulium, or combinations thereof, or wherein Ln is rare earth element or combination of rare earth elements, and M comprises: magnesium, calcium, strontium, barium, or combinations thereof.

In an embodiment for better results, the oxygen storage material comprises a combination of $A_2SO_4/A_2S$ and the $MSO_4/MS$, wherein A is an alkali metal element or combinations thereof and, M is an alkaline earth metal element or combinations thereof.

In an embodiment for better results, wherein A is selected from a list consisting of: lithium, sodium, potassium or combinations thereof, and wherein M is selected from a list consisting of: magnesium, calcium, strontium, barium, or combinations thereof.

In an embodiment for better results, wherein the oxygen storage material further comprises a metal catalyst for altering sulfate/sulfide redox kinetics, such as powders of metals, iron, nickel, platinum, palladium, cobalt, copper, or combinations thereof.

In an embodiment for better results, the oxygen storage material is combined with oxide catalysts to alter sulfate/sulfide redox kinetics, powders of metal oxides of iron, nickel, cobalt, copper, vanadium, manganese, molybdenum, praseodymium, or mixtures thereof.

In an embodiment for better results, wherein the electrolyte membrane is an oxide-ion conducting ceramic comprising $CeO_2$, $ZrO_2$, $LaGaO_3$, or mixtures thereof.

In an embodiment for better results, the oxide-ion conducting ceramic is doped by acceptor dopants of lower valence, in particular rare earth dopant, such as Gd or Y, or any alkaline earth metal, such as Ca, Ba, Sr, or mixtures thereof.

In an embodiment for better results, wherein the oxide-ion conducting ceramic is $LaGaO_3$ doped by acceptor dopants of lower valence, in particular as any alkaline earth metal, preferably Sr, Mg, or mixtures thereof.

In an embodiment for better results, wherein electronically conducting material comprises a metal from a list consisting of: platinum, gold, silver, copper or mixtures thereof.

In an embodiment for better results, wherein the gas-tight shell is a $ZrO_2$ ceramic doped with 8% (mol/mol) of $Y_2O_3$, or $CeO_2$ ceramic doped with 10% (mol/mol) of $Gd_2O_3$.

In an embodiment for better results, wherein one or more electrodes comprise platinum, gold, silver copper or mixtures thereof; in particular platinum or gold.

In an embodiment for better results, one or more electrodes comprise platinum, nickel, gold, silver, copper or mixtures thereof; in particular platinum or gold.

In an embodiment for better results, one or more electrodes comprise ceramic oxides of the perovskite or perovskite related structural families, offering mixed oxygen ion and electronic conductivity.

In an embodiment for better results, the inner electrode on the side of the oxygen storage material is a cermet material consisting of an oxygen-ion conducting ceramic oxide combined with a metallic phase, such as Ni, Co, Fe or Cu, Pt, Ag or their mixtures, including their alloys.

In an embodiment for better results, wherein the oxygen storage material, is sealed inside the shell.

In an embodiment for better results, wherein the absolute value of the charging voltage is lower than 2.2V.

Electrochemical cell battery comprising the battery of the present disclosure and/or parallel combination of a plurality of batteries of the present disclosure.

Oxygen pump comprising the device to the present disclosure.

Oxygen pump comprising the battery of the present disclosure wherein the first electrode comprises platinum or gold.

Method of operation of the device of the present disclosure wherein the redox sulfate/sulfide oxygen storage material has an oxygen integration of between 3 and 4 under an oxygen partial pressure of 1 atm-10-25 atm at temperature of 350-1000° C.

Method of operation of the device of the present disclosure wherein Ln2O2SO4 and/or Ln2O2S an oxygen integration of 4, under an oxygen partial pressure of 1 atm-10-25 atm at temperature of 300-950° C. and wherein Ln is described in any one of the previous claims.

Method of operation of the device present disclosure, wherein the Ln2O2SO4/Ln2O2S has a disintegration capacity of 4, under an oxygen partial pressure of 10-16 atm-1 atm at temperature of 700-900° C.

Method of operation of the device present disclosure, wherein the Ln2O2SO4/Ln2O2S, comprises an oxygen integration of 4, under an oxygen partial pressure of 10-14 atm-1 atm at 800° C.

Method of operation of the device present disclosure, wherein the Ln2O2SO4/Ln2O2S, comprises an oxygen disintegration of 4 under an oxygen partial pressure of 10-12 atm to 1 atm at 700° C.

In an embodiment for better results, a shuttle gas of containing a Steam/Hydrogen ($H_2O/H_2$) gas mixture or a Carbon Dioxide/Carbon Monoxide ($CO_2/CO$) gas mixture, diluted or not diluted by an inert gas, is contained in the said contained volume to increase the kinetics of oxygen transfer to the storage material.

In an embodiment for better results, the oxide-ion conducting ceramic is $CeO_2$ or $ZrO2$ optionally doped by further acceptor dopants Gd or Y.

In an embodiment for better results, the oxide-ion conducting ceramic is $LaGaO_3$ based, optionally doped by further acceptor dopants such as Mg or Sr.

In an embodiment for better results, for the oxide-ion conducting ceramic can in the micrometre range of thickness.

In an embodiment for better results, for the oxide-ion conducting ceramic can be below the micrometre range of thickness.

In an embodiment for better results, the electronically conducting material comprises a metal from a list consisting of: platinum, gold, silver, copper, nickel, iron or mixtures thereof.

In an embodiment for better results, the electrodes may be of ceramic oxides of the perovskite or perovskite related structural families, offering mixed oxygen ion and electronic conductivity.

In an embodiment for better results, the inner electrode on the side of the oxygen storage material may be a cermet material consisting of an oxygen-ion conducting ceramic oxide with a metallic phase, such as Ni, Co, Fe or Cu, Pt, Ag or their mixtures.

In an embodiment for better results the oxygen storage materials are combined with catalysts to alter redox kinetics, such as powders of metals, iron, nickel, platinum, palladium, cobalt, copper or their combinations.

In an embodiment for better results the oxygen storage materials are combined with oxide catalysts to alter sulfate/sulfide redox kinetics, such as powders of metal oxides of iron, nickel, cobalt, copper, vanadium or manganese, molybdenum, cerium or their combinations.

In an embodiment for better results, the oxygen storage material may be sealed inside an gas-tight shell completely made from the oxygen-ion conducting material.

Another aspect of the present disclosure is related to a method of operation of the device of the present subject matter wherein $Ln_2O_2SO_4$ and/or $Ln_2O_2S$ have an oxygen integration of 4, under an internal oxygen partial pressure of 1 atm-$10^{-25}$ atm, and used in the temperature range of 350-1000° C.

In an embodiment for better results, the $LnO_2SO_4/LnO_2S$ redox couple, comprises an oxygen integration of 4, under an internal oxygen partial pressure of between $10^{-25}$ atm-1 atm at 350° C.-750° C. using thin oxygen-ion conducting electrolytes of thicknesses below 50 µm.

In an embodiment for better results, the $Ln_2O_2SO_4/Ln_2O_2S$ redox couple has a disintegration capacity of 4, under an internal oxygen partial pressure of $10^{-20}$ atm-1 atm at temperature of 700-1000° C.

In an embodiment for better results, the $MSO_4/MS$ redox couple, comprises an oxygen integration of 4, under an internal oxygen partial pressure of between $10^{-25}$ atm-1 atm at 350° C.-750° C. using thin oxygen-ion conducting electrolytes of thicknesses below 50 µm.

In an embodiment for better results, the $MSO_4/MS$ redox couple, comprises an oxygen integration of 4, under an internal oxygen partial pressure of between $10^{-20}$ atm-1 atm at 700° C.-900° C.

In an embodiment for better results, the $A_2SO_4/A_2S$ redox couple, comprises an oxygen integration of 4, under an internal oxygen partial pressure of between $10^{-25}$ atm-1 atm at a temperature in the range 350° C.-750° C. using thin oxygen-ion conducting electrolytes of thicknesses below 50 µm.

Another aspect of the present disclosure is a rechargeable battery comprising the device for oxygen storage of the present disclosure. In particular a series and/or parallel combination of a plurality of batteries.

In an embodiment for better results the oxygen released during charging is utilised in external oxidation reactions, for example oxidation of chemicals such as CO or NOx.

In an embodiment for better results the oxygen removed from the surrounding atmosphere during discharge assists external reduction reactions, for example reduction of chemicals such as $N_2O$.

In an embodiment for better results the oxygen removal from the surrounding atmosphere during discharge and liberated during the discharging step is utilised as a method for oxygen purification.

The present disclosure provides a high temperature battery (350-1000° C., preferably 450-900° C.) with higher specific energy density than lithium-ion batteries. Moreover, this solid electrolyte system prevents short-circuit from happening and is more stable than conventional liquid electrolytes used in Li-ion and Li-air batteries. Volatilization and flammability problems are also overcome with the choice of solid state and inflammable materials. As an additional advantage, it has a much longer and safer lifetime than conventional Li-batteries since no lithium dendrite or any other dendrites are formed. Hence, the cost per kWh of energy is expected to be comparable to or better than the conventional Li-ion or Li-air batteries due to the combination of a high energy density and high lifetime duration. The proof is presented in terms of reversibility, stability and electrical recharging ability. Another advantage is that the device is able to use only oxygen from air or any other oxygen containing atmosphere, and therefore it does not need a fuel distribution system.

BRIEF DESCRIPTION OF THE DRAWINGS

The following figures provide preferred embodiments for illustrating the description and should not be seen as limiting the scope of invention.

DETAILED DESCRIPTION

The device, in particular a battery, of the present disclosure comprises: an gas-tight container that includes or that is entirely formed from a solid state oxygen-ion conducting electrolyte, which has electronically conducting electrode layers on its both sides, electrical contacts, and an oxygen storage/release material, prepared from a Sulfate/Sulfide redox compound consisting of $Ln_2O_2SO_4/Ln_2O_2S$ or $A_2SO_4/A_2S$ or $MSO_4/MS$ redox couples, or an oxygen storage material made from their mixtures, sealed inside the container.

The separation and reunion of oxygen ions and electrons happen at the interface between the electrodes and the oxygen-ion conducting electrolyte. The oxygen is pumped out of the chamber during charging process using electricity, preferably from a direct current power source. $Ln_2O_2SO_4$ releases oxygen by the reduction of the sulfate ion.

$$Ln_2O_2SO_4 \rightarrow Ln_2O_2S + 2O_2 \quad (1)$$

$MSO_4$ releases oxygen by the reduction of the sulfate ion.

$$MSO_4 \rightarrow MS + 2O_2 \quad (2)$$

$A_2SO_4$ releases oxygen by the reduction of the sulfate ion.

$$A_2SO_4 \rightarrow A_2S + 2O_2 \quad (3)$$

Figure 2A:
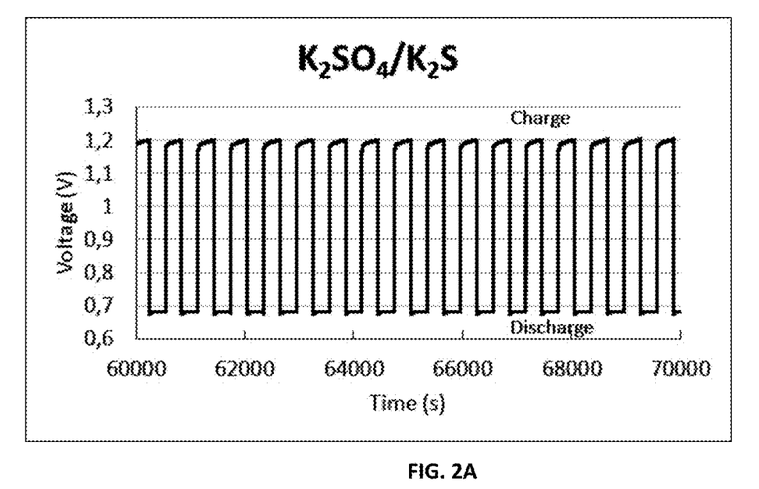
FIGS. 2A-2B are a graphics showing the working charge/discharge conditions of the battery with the battery at 600° C. using a $H_2/H_2O$ sweep gas, diluted with 90% $N_2$.
Figure 2B:
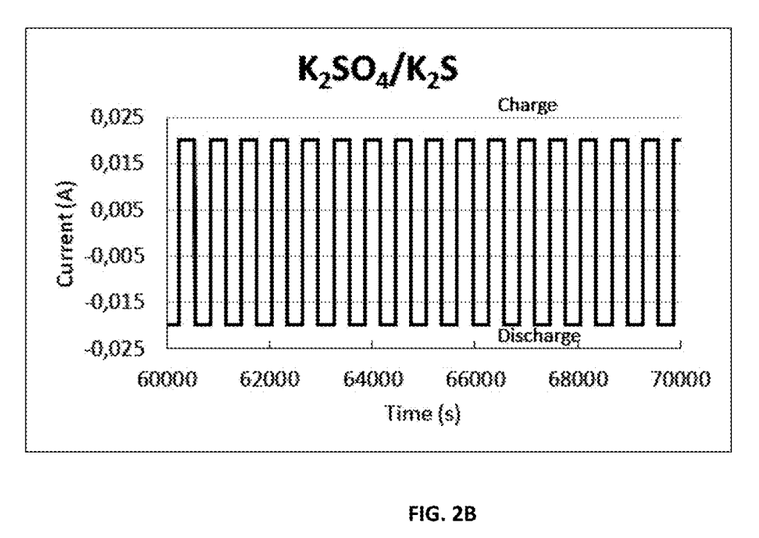
Figure 3A:
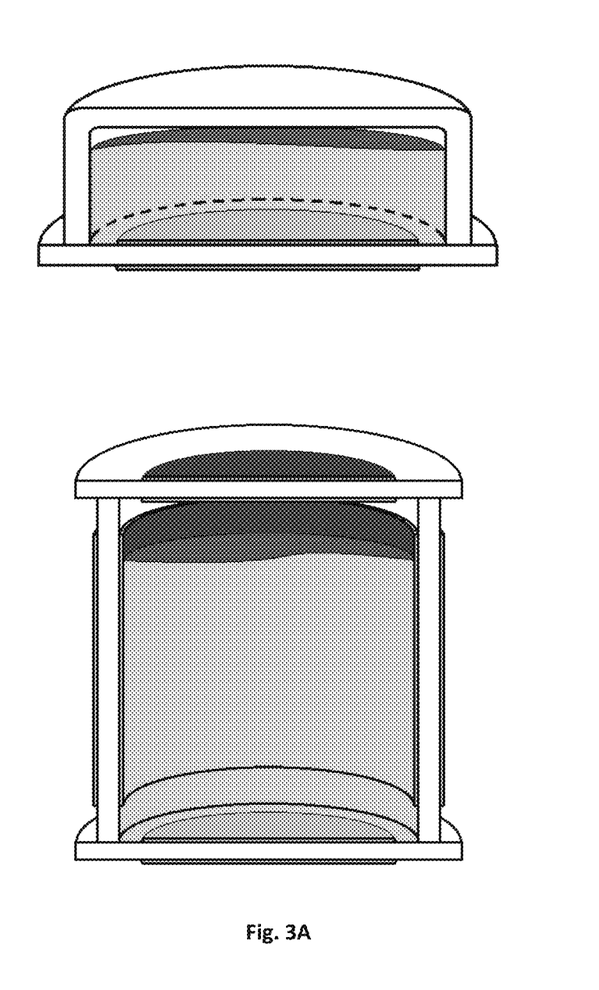
FIGS. 3A-3C are representations of the design and components of several embodiments of the battery of the present disclosure.
Figure 3B:
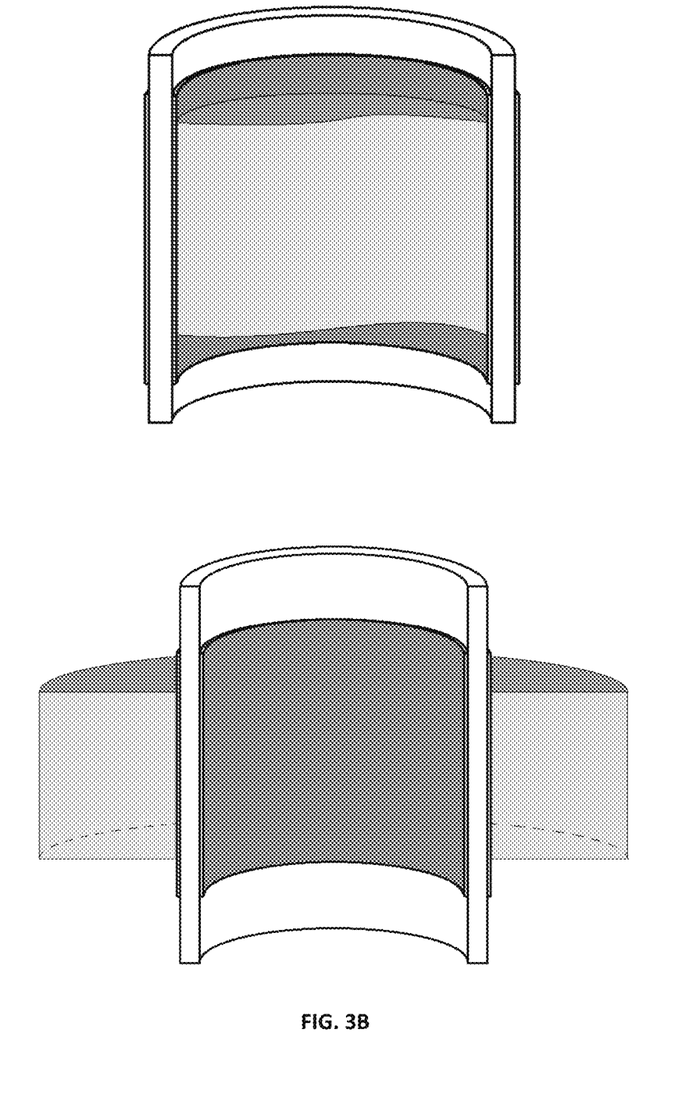
Figure 3C:
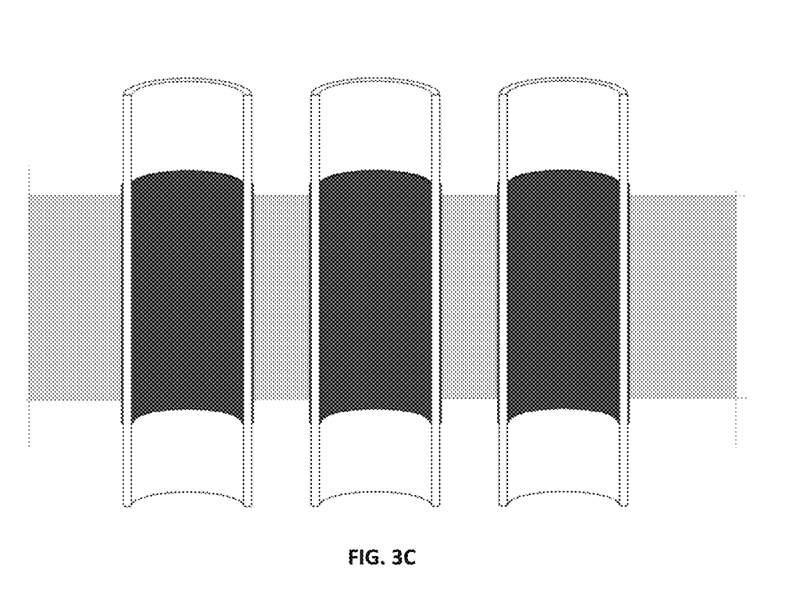

The pumping oxygen out from the cell stops when the oxygen partial pressure inside the cell, and respective electromotive force (EMF), reach some critical temperature-dependent values. In embodiments containing $La_2O_2SO_4$, $CaSO_4$, or $K_2SO_4$, as the oxygen storage material these values are shown by Table 1, Table 2 and Table 3, respectively. These values can be determined by the coulombic titration technique (FIGS. 2A-2B). For example, $La_2O_2SO_4$ reduction at 900° C. stops at the oxygen partial pressure of ~$10^{-12}$ atm inside the container (corresponding EMF value of ~0.7 V, (with respect to reference gas of oxygen)). Also, to avoid the yttria-stabilised zirconia and/or oxygen storage material disintegration, the charging voltage shall be kept below the absolute value of 2.2 V.

TABLE 1

Represents the battery of embodiment 1 operational conditions.

| | Temperature | | | | |
|---|---|---|---|---|---|
| | 900° C. | 850° C. | 800° C. | 750° C. | 700° C. |
| Reduction voltage | 0.70 ± 0.02 V | 0.72 ± 0.02 V | 0.74 ± 0.02 V | 0.76 ± 0.02 V | 0.78 ± 0.02 V |

TABLE 2

Represents the battery of embodiment 4 operational conditions.

| | Temperature | | | | |
|---|---|---|---|---|---|
| | 900° C. | 850° C. | 800° C. | 750° C. | 700° C. |
| Reduction voltage | 0.70 ± 0.02 V | 0.72 ± 0.02 V | 0.74 ± 0.02 V | 0.77 ± 0.02 V | 0.79 ± 0.02 V |

TABLE 3

Represents the battery of embodiment 5 operational conditions.

| | Temperature | | | | |
|---|---|---|---|---|---|
| | 900° C. | 850° C. | 800° C. | 750° C. | 700° C. |
| Reduction voltage | 0.87 ± 0.02 V | 0.89 ± 0.02 V | 0.91 ± 0.02 V | 0.93 ± 0.02 V | 0.958 ± 0.02 V |

On completion of the charging process and by connection of an external workload to the battery, the reoxidation process occurs, for the $Ln_2O_2SO_4/Ln_2O_2S$ or $A_2SO_4/A_2S$ or $MSO_4/MS$ redox couples, respectively:

$$Ln_2O_2S + 2O_2 \rightarrow Ln_2O_2SO_4 \quad (4)$$

$$MS + 2O_2 \rightarrow MSO_4 \quad (5)$$

$$A_2S + 2O_2 \rightarrow A_2SO_4 \quad (6)$$

Oxygen molecules in the surrounding atmosphere, driven by the chemical potential gradient across the electrolyte, dissociate into ions consuming electrons on the electrode-electrolyte surface and conduct across the oxygen-ion conducting electrolyte, while electrons pass over an external load. The recombination of electrons with the oxygen-ions at the electrode at the opposing side of the electrolyte membrane, inside the container, combine with $Ln_2O_2S$ to form $Ln_2O_2SO_4$ or with MS to form $MSO_4$ or with $A_2S$ to form $A_2SO_4$, respectively.

As it is clear from formulae (1-4), the sulfate/sulfide redox couple is advantageous as an oxygen storage/release material because theoretically, 1 mole of rare earth sulfate can provide 2 moles of $O_2$, which involve 8 moles of electrons in the charging/discharging process. The electricity is stored in the form of oxygen integrated into the sulfate structure, which enables such oxygen storage/release through the oxidation/reduction of sulfur. Additionally, a powdered or porous structure of the oxysulfate/oxysulfide facilitates oxygen diffusion inside the cell, thus increasing charging/discharging rates. The $MSO_4/MS$, $A_2SO_4/A_2S$ embodiments are advantageous as a battery material over that of the aforementioned oxysulfate embodiments, due to their lower weight and availability.

In an embodiment, $La_2O_2SO_4/La_2O_2S$ which are lanthanum oxysulfate and lanthanum oxysulfide can be prepared by a suitable solid state reaction or soft chemical or pyrolysis method. According to the present disclosure, $La_2O_2SO_4/La_2O_2S$ can be prepared, for example, by the pyrolysis of a lanthanum sulfate octahydrate $(La_2(SO_4)_3 \cdot 8H_2O)$, at the temperature of 850-1050° C. in air or 850-1100° C. in oxygen.

In an embodiment, yttria stabilised zirconia is advantageous as the electrolyte of the battery because it is mechanically and chemically stable, and it is a fast oxygen ionic conductor. Yttria stabilised zirconia can be prepared by the mechanical synthesis process. For example, Yttria ($Y_2O_3$) and Zirconia ($ZrO_2$) may be mixed stoichiometrically and transferred into the milling vials, where the powder is high energy milled at a rotation rate of 650 rpm. The nanopowder thereby produced is shaped into cylinder and discs with subsequent firing at 1400-1550° C. in air for 2 hours, at heating and cooling rates of 2° C./min.

In an embodiment, note that platinum paste will not be poisoned or damaged during the operation of the battery, not like in the PEMFCs where it is easily poisoned and cannot be reused. In an actual battery targeted for the market, we can replace platinum with traditional electrode of SOFCs, such as mixed conducting perovskite or perovskite-based electrodes to act as electrocatalytically active electrode materials. These materials can be applied easily by a person skilled in the art.

The present disclosure is described in detail below based on embodiment, but the present invention is not limited thereto.

In the following embodiments, the battery was prepared by sealing the oxygen storage/release materials inside the yttria stabilised zirconia container. The oxygen storage/release materials, $Ln_2O_2SO_4$, were prepared by pyrolysis of lanthanum sulfate octahydrate $(La_2(SO_4)_3 \cdot 8H_2O)$ or other lanthanide equivalents. The yttria stabilised zirconia container was prepared via solid state reaction. Platinum paste was purchased from HERAEUS. Platinum wire was purchased from PI-KEM. Ceramic sealant was purchased from AREMCO. The oxygen storage material for the $CaSO_4$ embodiment was a commercial powder purchased from Sigma Aldrich.

Embodiment 1

Step 1: Lanthanum oxysulfate $La_2O_2SO_4$ used in the following embodiment was prepared as follows. First, lanthanum sulfate octahydrate $(La_2(SO_4)_3 \cdot 8H_2O)$ was heated in air from room temperature to 550° C. and kept for 5 hours, and then heated to 900° C. and kept for 5 hours to decompose it. The heating and cooling rates were 2° C./min. The powder was then pulverized in the planetary ball mill with absolute ethanol at a speed of 200 rpm, for 10 hours. At last, it was dried in the oven at 50° C. overnight.

Step 2: The container of the battery in the current embodiment was made completely of yttria stabilised zirconia, which is prepared by the mechanical synthesis process. Yttria ($Y_2O_3$) and Zirconia ($ZrO_2$) were mixed stoichiometrically and transferred into the milling containers, where the powder was high energy ball-milled at a rotation rate of 650 rpm. Then it was pressed into cylinder and disc forms. The cylinder dimensions were: wall thickness 2 mm, length 15 mm, and external diameter 12 mm. The disc dimensions were: thickness 2 mm, diameter 10 mm. All of the yttria stabilised components were fired at 1450° C. in air for 5 hours, with heating and cooling rates of 2° C./min.

Step 3: Commercial platinum paste was diluted with 96% vol. ethanol and painted on both sides of the cylinder and disc, platinum wire was adhered to the painted surfaces at the same time and dried at 950° C. for 30 mins. The heating and cooling rates were 2° C./min.

Step 4: 5 g of the lanthanum oxysulfate $La_2O_2SO_4$ was sealed inside the yttria stabilised zirconia container with a commercial ceramic sealant hermetically at 1115° C. for 20 minutes, with heating and cooling rates of 2° C./min.

Embodiment 2

The battery was obtained in the same manner as in Embodiment 1, except that the yttria stabilised zirconia cylinder was instead replaced by a tube of hastelloy.

Embodiment 3

The battery was obtained in the same manner as in Embodiment 2, except that the thickness of the electrolyte was below 50 μm.

Embodiment 4

The battery was obtained in the same manner as in Embodiment 1, except that the oxygen storage material of step 4 was $CaSO_4$.

Embodiment 5

The battery was obtained in the same manner as in Embodiment 1, except that the oxygen storage material of step 4 was $K_2SO_4$.

Embodiment 6

The battery was obtained in the same manner as in Example 1, except that the oxygen liberated on the discharging step was used to oxidize the external gases CO or NOx.

Figure 1:
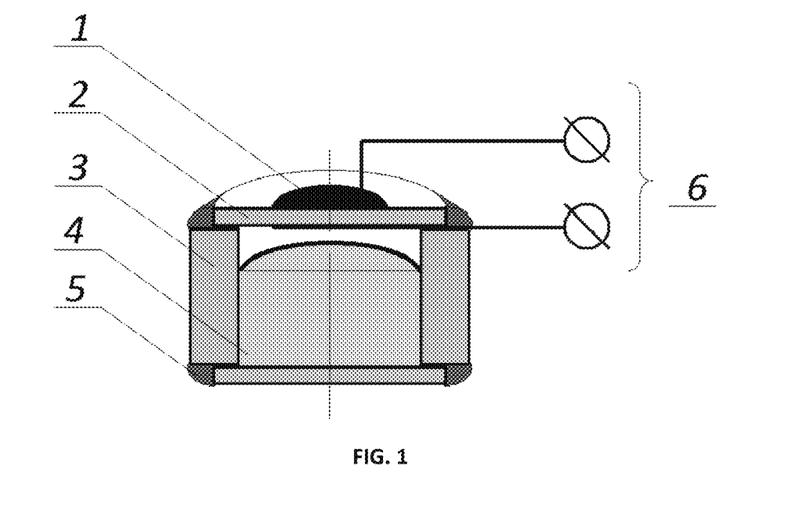
FIG. 1 is a representation of the design and components of an embodiment of the battery wherein
(1) represents Pt oxygen pump,
(2) represents the electrolyte, in particular yttria stabilised zirconia or gadolinia doped $CeO_2$ electrolyte,
(3) represents an gas-tight container, containing a solid oxygen-ion conducting electrolyte, in particular yttria stabilised zirconia or gadolinia doped $CeO_2$,
(4) represents a $Ln_2O_2SO_4/Ln_2O_2S$ or $A_2SO_4/A_2S$ or $MSO_4/MS$, oxygen storage material contained in said contained volume, or an oxygen storage material made from their mixtures;
(5) represents a sealing material,
(6) represents the electrodes, in particular Pt or Au electrical contacts.

In an embodiment, FIG. 1 is a representation showing the design and components of the battery. All the components are solid, preventing short-circuit from happening and is more stable than conventional liquid electrolytes used in Li-ion and Li-air batteries. Volatilization and flammability problems are also overcome with the choice of pure solid and inflammable material. The size of the battery can be easily enlarged to hold more oxygen storage material and hence the total capacity of the actual battery is adjustable to a big extent.

In an embodiment, FIGS. 2A-2B are graphs showing the working behaviour of an $A_2SO4/A_2S$ version of the battery where A is potassium ($K_2SO4/K_2S$) with the battery at 600° C. using a $H_2/H_2O$ sweep gas, diluted with 90% $N_2$. In this case the open circuit voltage of the battery is 0.99V (with respect to oxygen) and the charging and discharging voltages are shown to be 0.70±0.02 V and 0.70±0.02 V, respectively.

The term "comprising" whenever used in this document is intended to indicate the presence of stated features, integers, steps, components, but not to preclude the presence or addition of one or more other features, integers, steps, components or groups thereof.

The disclosure should not be seen in any way restricted to the embodiments described and a person with ordinary skill in the art will foresee many possibilities to modifications thereof. The above described embodiments are combinable. The following claims further set out particular embodiments of the disclosure.

The invention claimed is:

1. A rechargeable battery having a solid-state device for oxygen storage and release, the rechargeable battery comprising:
   a gas-tight shell that contains or is made in its entirety of an oxygen-ion conducting electrolyte and defines a contained volume;
   an oxygen storage material consisting of a sulfate/sulfide redox couple, contained in said contained volume;
   a first electrode in contact with said electrolyte on a first side and in contact with said contained volume;
   a second electrode in contact with said electrolyte on a second side of the electrolyte and in contact with an oxygen containing atmosphere;
   an electrical contact made with each electrode;
   wherein the electrodes are selected from an electronically conducting material;
   wherein the oxygen exchanged with the atmosphere outside the gas tight container, may or may not be involved in further chemical reactions or be utilised as a source of pure oxygen;
   wherein the oxygen storage material is selected from a list consisting of the following elements: gadolinium, lanthanum, cerium, neodymium, samarium, dysprosium, erbium, europium, holmium, terbium, ytterbium, yttrium, scandium, lutetium, magnesium, calcium, strontium, barium, lithium, sodium, potassium, and combinations thereof; and
   wherein the oxygen storage material is sealed inside the shell, and wherein the electrolyte membrane is an oxide-ion conducting ceramic comprising $CeO_2$, $ZrO_2$, $LaGaO_3$, or mixtures thereof.

2. The rechargeable battery of claim 1, wherein the oxygen storage material is in powder, porous, or molten form, or mixtures thereof.

3. The rechargeable battery of claim 1, wherein the contained volume further comprises a shuttle gas for increase the kinetics of oxygen transfer to the storage material.

4. The rechargeable battery of claim 3, wherein the shuttle gas comprises: a steam/hydrogen ($H_2O/H_2$) gas mixture, a carbon dioxide/carbon monoxide ($CO_2$/CO2) gas mixture, or a mixture thereof.

5. The rechargeable battery of claim 4, wherein the shuttle gas further comprises an inert gas for diluting.

6. The rechargeable battery of claim 1, wherein the sulfate/sulfide redox couple is rare earth oxysulfate $Ln_2O_2SO_4/Ln_2O_2S$ based oxygen storage material, wherein Ln comprises: gadolinium, lanthanum, cerium, neodymium, samarium, dysprosium, erbium, europium, holmium, terbium, ytterbium, yttrium, scandium, lutetium, promethium, or thulium, or combinations thereof, and wherein Ln is rare earth element or combination of rare earth elements.

7. The rechargeable battery of claim 1, wherein the sulfate/sulfide redox couple is an alkaline earth metal sulfate $MSO_4/MS$ based oxygen storage material, wherein M comprises: magnesium, calcium, strontium, or barium, or combinations thereof, and wherein M is an alkaline earth metal element or combination of alkaline earth metal elements.

8. The rechargeable battery of claim 1, wherein the sulfate/sulfide redox couple is an alkali metal sulfate $A_2SO_4/A_2S$ based oxygen storage material, wherein A comprises: lithium, sodium, or potassium, or combinations thereof, and wherein A is an alkali metal element or combination of alkali metal elements.

9. The rechargeable battery of claim 1, wherein the oxygen storage material is a mixture of $Ln_2O_2SO_4/Ln_2O_2S$ and/or $MSO_4/MS$ and/or $A_2SO_4/A_2S$ in any ratio, either as independent phases or as a combined phase,
   wherein Ln is rare earth element or combination of rare earth elements,
   wherein M is an alkaline earth metal element or combination of alkaline earth metal elements; and
   wherein A is an alkali metal element or combination of alkali metal elements.

10. The rechargeable battery of claim 1, wherein the oxygen storage material further comprises a metal catalyst for altering sulfate/sulfide redox kinetics, wherein the metal catalyst comprises a powder of one or more metals, selected from the group consisting of: iron, nickel, platinum, palladium, cobalt, copper, and combinations thereof.

11. The rechargeable battery of claim 1, wherein the oxygen storage material is combined with an oxide catalyst to alter sulfate/sulfide redox kinetics, wherein the oxide catalyst comprises at least one metal oxide of iron, nickel, cobalt, copper, vanadium, manganese, molybdenum, praseodymium, or mixtures thereof.

12. The rechargeable battery of claim 1, wherein the oxide-ion conducting ceramic is doped by at least one acceptor rare earth dopant wherein the at least one acceptor rare earth dopant is Gd, Y, or any alkaline earth metal, or mixtures thereof.

13. The rechargeable battery of claim 1, wherein the oxide-ion conducting ceramic is $LaGaO_3$ and is doped by at least one acceptor dopant of lower valence, where the at least one acceptor dopant comprises any alkaline earth metal or mixtures thereof.

14. The rechargeable battery of claim 1, wherein the electronically conducting material comprises a metal selected from the group consisting of: platinum, gold, silver, copper, and mixtures thereof.

15. The rechargeable battery of claim 1, wherein the gas-tight shell is a $ZrO_2$ ceramic doped with 8% (mol/mol) of $Y_2O_3$, or a $CeO_2$ ceramic doped with 10% (mol/mol) of $Gd_2O_3$.

16. The rechargeable battery of claim 1, wherein one or more of the electrodes comprises platinum, nickel, gold, silver, or copper, or mixtures thereof.

17. The rechargeable battery of claim 1, wherein one or more of the electrodes comprises ceramic oxides of perovskite or perovskite related structural families, offering mixed oxygen ion and electronic conductivity.

18. The rechargeable battery of claim 1, wherein the first electrode on the side of the oxygen storage material is a cermet material consisting of an oxygen-ion conducting ceramic oxide combined with a metallic phase, wherein the metallic phase comprises Ni, Co, Fe or Cu, Pt, Ag or mixtures or alloys thereof.

19. An electrochemical cell battery comprising the device according to claim 1.

20. An oxygen pump comprising the device according to claim 1.

* * * * *